May 17, 1938.   F. S. MABRY   2,117,895
TRANSMISSION SYSTEM
Filed June 9, 1934   2 Sheets-Sheet 1
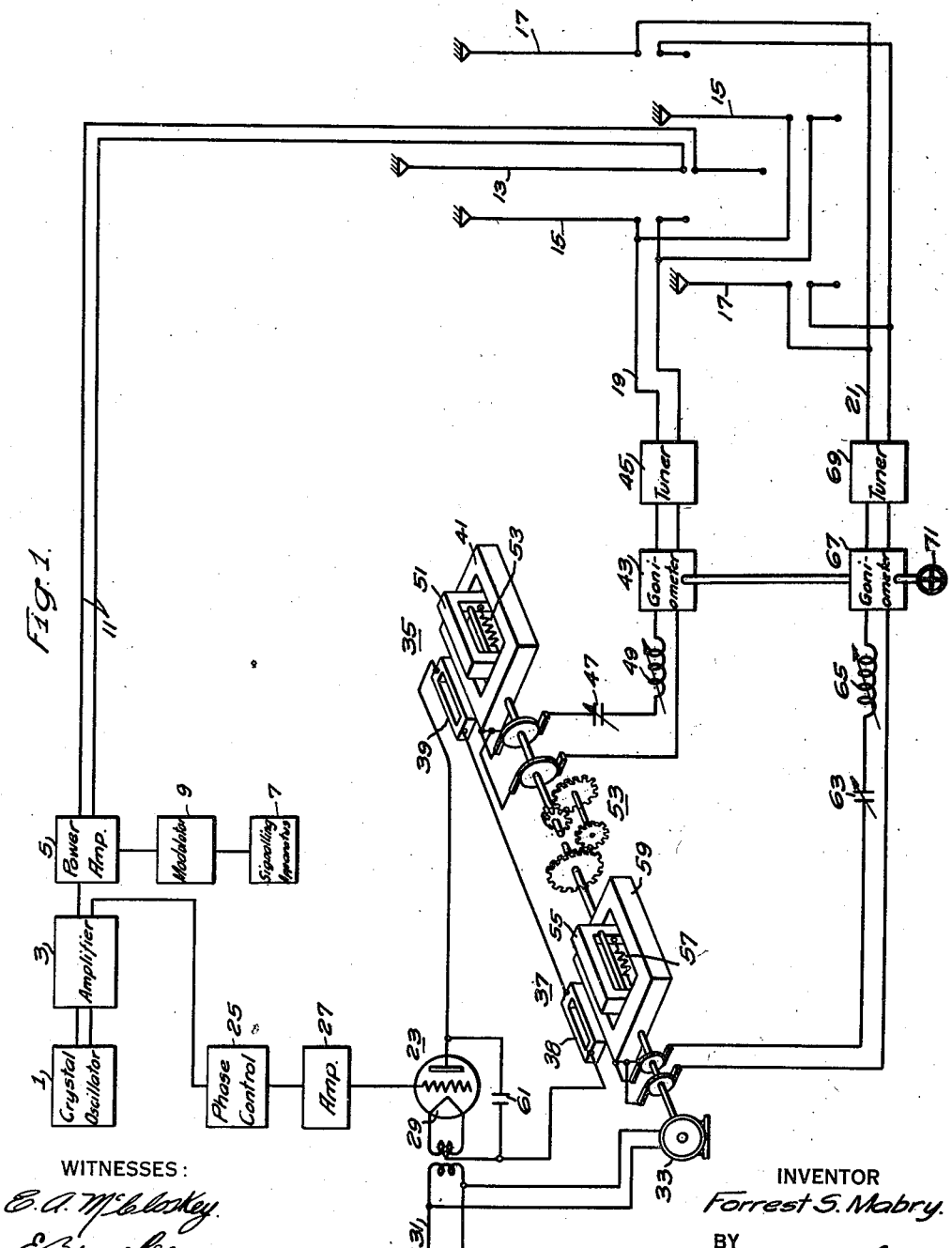
WITNESSES:
E. A. McCloskey
E. Brosler
INVENTOR
Forrest S. Mabry.
BY
F. W. Lyle.
ATTORNEY May 17, 1938.   F. S. MABRY   2,117,895
TRANSMISSION SYSTEM
Filed June 9, 1934   2 Sheets-Sheet 2
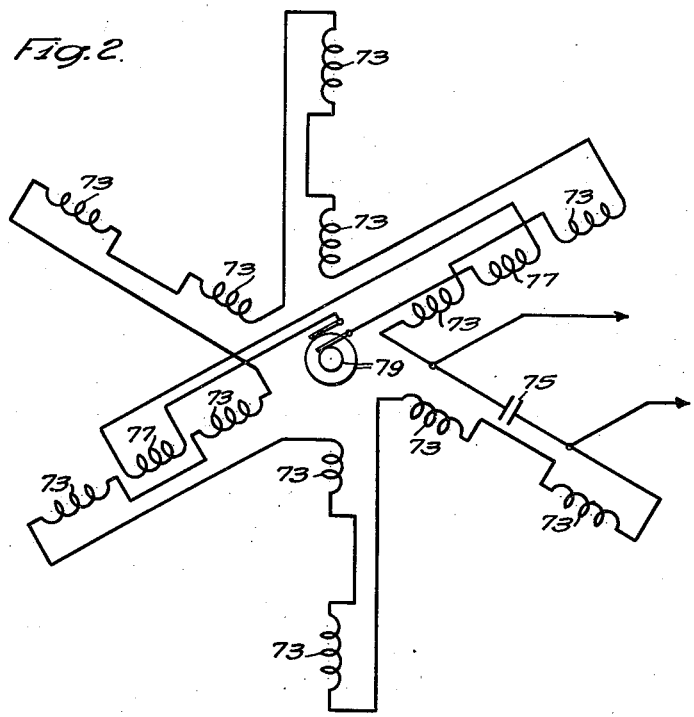
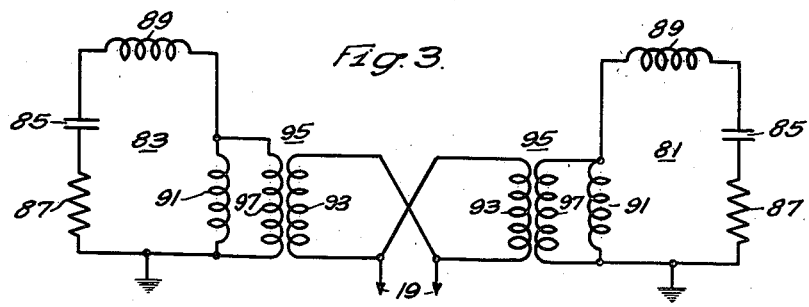
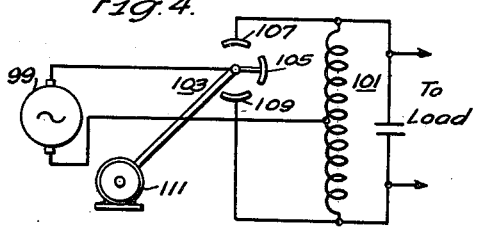
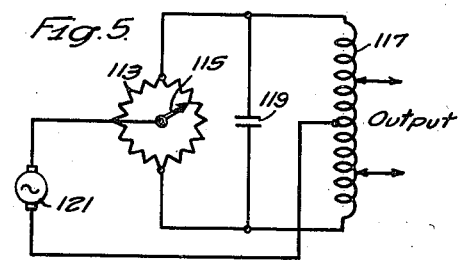
WITNESSES:
E. A. McCloskey
E. Brosler
INVENTOR
Forrest S. Mabry.
BY
F. W. Lefle.
ATTORNEY Patented May 17, 1938

2,117,895

UNITED STATES PATENT OFFICE 2,117,895

TRANSMISSION SYSTEM

Forrest S. Mabry, Springfield, Mass., assignor to Westinghouse Electric & Manufacturing Company, East Pittsburgh, Pa., a corporation of Pennsylvania Application June 9, 1934, Serial No. 729,817

5 Claims. (Cl. 250—11)

This invention relates to radio signalling devices and is particularly adapted to systems involving the modulation and suppression of a carrier, such systems finding application for example in the guidance of airplane traffic.

It has previously been the practice, where it was desired to modulate and suppress a carrier, to employ thermionic devices for the purpose. Two of these were used and were connected in push-pull on the plate side. The carrier frequency was applied to both grids in time phase while the modulating frequency was applied to either the plates or grids with 180 degrees time phase between tubes. With this type of system for carrier suppression, it was necessary to select and match tubes and then rely upon constant similarity existing between the tubes and their characteristics during their use, to obtain satisfactory and successful operation of the system. Particularly in systems employed for the laying out of radio beacons in the guidance of aircraft is it important that the operating characteristics of the tubes remain similar throughout their use, for a change or failure of any of the tubes is likely to shift the position of the beacon in space and guide aircraft to destruction instead of safety.

It is an object of my invention to obtain carrier suppression without the use of vacuum tubes.

A further object of my invention is to obtain mechanical suppression of a carrier wave.

It is a further object of my invention to produce the required steady modulation of the radiation in a more expeditious and less expensive manner than has been possible heretofore.

It is a further object of my invention to modulate the output of a radio-frequency sending device by a mechanically driven device, steadily and periodically varying the relation of the circuit including the high frequency source to the output circuit.

It is a further object of my invention to obtain a better control of the space-distribution of the radiated energy by securing a more constant phase relation between the current in the several radiating circuits.

It is a further object of my invention to minimize the consequences of the effects of weather conditions upon the period of an antenna.

It is a further object of my invention to provide a means for simultaneously modulating several high-frequency currents with the same modulation frequency or with modulation frequencies having a constant ratio.

Another object of my invention is to provide means for mechanically suppressing and modulating a carrier wave.

Other objects of my invention and details of the apparatus employed will be apparent from the following description and the accompanying drawings, in which:

Figure 1 is a diagram of the circuits and apparatus employed in one form of my invention, Fig. 2 is a diagram illustrating a modification of the mechanically driven coupling device, Fig. 3 is a diagram illustrating a method of connection between line wires and antennae; and Figs. 4 and 5 illustrate other modifications of coupling devices embodying features of my invention.

In Fig. 1 the crystal oscillator represented by the usual block diagram 1 includes a generator of electric oscillations, the frequency of which is fixed by a crystal and a succession of amplifiers to obtain therefrom some harmonic suitable for radiation signalling. Block 3 represents any necessary or desired further amplifier which may include amplifiers that produce further harmonics and deliver a higher frequency if this is desired. The block 5 represents a power amplifier connected to the amplifier and modulated from the signalling device 7 acting through the modulator 9. In this way, signal-controlled power is delivered to the line 11 by means of which it is impressed upon the non-directional antenna 13.

The portions of Fig. 1 so far described are not new but are illustrated to show the way in which they are associated with the devices I have invented. The non-directional antenna 13 is associated with two or more sets of antennae by means of which the desired directional space pattern of the radiated energy is obtained. As illustrated in Fig. 1, the directional radiators 15 and 17 comprising sets of separated straight antennae properly positioned to obtain the space-pattern equivalent to that of a pair of crossed loops, although crossed loops may be employed in lieu of the separated straight antennae.

One set of straight antennae 15 corresponding to one loop are energized over the line 19 and the second set of straight antennae 17 corresponding to a second loop are energized over the line 21. Both lines are fed with power obtained from an amplifier 23 through a phase controlling device 25 and a further amplifier 27. For convenience of illustration, the power amplifier 23 is shown separately. This tube may, however, be the final tube of the amplifier represented in the block 27. The source of direct current potential for the tube has not been illustrated.

The filament 29 of the tube is energized in the usual way from a line 31 which is preferably supplied with commercial frequency. From the same source, a motor 33 is energized which drives the changeable coupling devices 35 and 37 respectively. For the line 19, the changeable coupling includes a stationary coil 39 in the plate circuit of the amplifier 23, a rotating coil 41 which is connected through slip rings to the line 19. This line extends through a goniometer 43 and a tuning device 45. If desired, it may include a condenser 47 and an inductor 49 by means of which the power factor of the line 19 may be controlled. Connected on the same shaft with the coil 41 is a companion coil 51, the terminals of which are connected by a resistor 53. Preferably, the coil 51 is at right angles to the coil 41. The shaft on which these coils are mounted is driven by the motor 33 through a speed-changing gear 53 which couples this shaft to the motor shaft upon which a coil 55 equipped with a loading resistor 57 and a coil 59 connected through slip rings to the line 21 are mounted.

The coils driven by the motor 33 rotate in proximity to the stationary coils 38 and 39 as illustrated. The coils 38 and 39 are connected in series in the plate circuit of the tube 23. Preferably, this circuit includes a condenser 61 by means of which the inductance of the two coils is counteracted at the frequency delivered by the tube.

The line 21 may include a condenser 63 and an inductor 65 similar in purpose to the condenser 47 and inductor 49 in line 19. A goniometer 67 and a tuner 69 similar to equivalent apparatus in line 19 are also included in the line 21. The goniometer 67 is manipulated by the same shaft which controls the goniometer 43. A handle 71 is shown on the diagram to indicate this common control.

In the operation of the device, as illustrated in Fig. 1, high frequency oscillations are generated by the crystal oscillator 1 which are amplified, and, if necessary, increased in frequency by the amplifier 3. After further amplification by the power amplifier 5 and modulation in a well known way, the signal from the signalling source is delivered over the line 11 to the antenna 13. This antenna is preferably located at the center of the polygon defined by the directive antenna setup, whereby signals or communications originating at the signal source 7 may be transmitted without interfering with the space-pattern created by the directive antennae.

The output from the amplifier 3 is also impressed through the amplifiers 27 and 23 on the stationary coils 38 and 39. There is inductive coupling between the coil 38 and the rotating coil 59. When the coil 59 is in the position producing greatest coupling to the coil 38, the current delivered over the line 21 through the goniometer 67 and the tuning device 69 to the antennae 17 is a maximum. The radiation from these antennae is, therefore, a maximum. As coil 59 is rotated through a complete revolution, two positions of maximum and two positions of minimum or zero coupling occur. As the rotor coil 59 passes through the two zero points the relative phase of the current in coil 59 is reversed 180 degrees. By causing the current in coil 59 to vary at a regular rate, reversing its phase after each half cycle, the original carrier frequency is eliminated leaving what is generally known as sideband frequency currents, in the output circuit. The output circuit in this case consists of rotor coil 59, tuning coil and condenser 65 and 63, goniometer 67, tuner 69, line 21 and antennae 17. Thus it is seen how "sideband frequency" or "suppressed carrier" radiation takes place from antennae 17 due to rotating coil 59. Thus in the output circuit is obtained a suppressed carrier modulated at a frequency proportional to the revolutions per minute of the coil 59.

Changes in the coupling between the coil 38 and the coil 59 introduce some changes in the load upon the coil 37. In order that the load may be as steady as possible, the coil 55 is placed in as nearly as possible the same coupling relation to the coil 38 as the coil 59, but at 90° different phase as regards the rotation.

The load on the coil 38 is thus divided between coils 55 and 59. The load presented by coil 59 is dependent upon the resistance of line 21 and its associated devices. It includes the radiation resistance of the vertical antennae 17 operating in combination. By correlating the resistance of resistor 57 and the coefficient of coupling of coil 55 to coil 38 with the resistance connected to coil 59 and the coefficient of coupling of coil 59 to coil 38, the load on coil 38 can be made substantially the same, regardless of the position of the motor shaft. This minimizes the change in load on the coil 38 during the rotation of coils 41 and 59.

Similar conditions exist in the line 19 and its associated apparatus, the mechanical modulator 35 producing in the antenna 15 a suppressed carrier modulated at a frequency proportional to the rotational speed of the coil and the load on the stationary coil is maintained practically constant by means of the coil and its shunting resistor. The frequency of modulation, however, will differ from that in the antennae 17 by reason of the speed changing gears which cause the coil to rotate at a speed differing from that of the coil.

The proper phase relation for the high frequency current between antennae 15 and 17 is secured by adjustment of the goniometers 43 and 67 and the tuning devices 45 and 69. Further precautions for ensuring the correctness of this phase relation will be explained later in connection with Fig. 3.

The proper phase relation between the high-frequency currents in the antenna 13 and the antennae 15 and 17 is secured by the phase-adjusting apparatus represented by the block 25.

The difference in rotational speed between the coils 41 and 59 produces a difference in modulation frequency in the outputs of the antennae 15 and 17. The receiving device, therefore, can be made to distinguish between the two independent carriers of the same frequency and in this way the pilot of an airplane carrying the receiving device can know whether he had remained in the intended channel.

In Fig. 2 there is illustrated a variable coupling device similar in general principles to that shown in Fig. 1. The coils 73 are stationary and are connected in series with a condenser 75 and constitute the plate circuit of a tube similar to tube 23 of Fig. 1 which is not shown. The coils 77 are connected in series and to the brushes of a pair of slip rings 79. They are similar in purpose to the coil 41 or 59. As the shaft carrying coils 77 rotates, these coils pass successively between aligned pairs of coils 73. When the coils are half-way between one pair of coils and the next they are in position of minimum coupling. In the illustrated position, they are in a position of maximum coupling. For the same frequency of modulation, a smaller mechanical speed is necessary with the apparatus of Fig. 2 than with the equivalent apparatus 35 or 37 illustrated in Fig. 1. Also, for two modulators, instead of gearing to rotate the shafts at different speeds as is shown in the system of Fig. 1, a different number of pairs of stationary coils may be provided. It will also be apparent that instead of pairs of coils, single coils may be used although the change in coupling is greater with pairs of coils, as illustrated.

When employing pairs of antennae such as antennae 15 and 17 for obtaining directional propagation, it is highly important that the phase of the current in one member of each pair be exactly 180° from the phase of the current in the other member. For this reason, it is important that the change in the tuning of the antenna with changing weather conditions shall have minimum effect upon the phase of the current in one antenna with the current in the other antenna of a pair of antennae such as antenna 15 or antenna 17. If the antenna circuit be tuned exactly to resonance and coupled to the transmission line by a transformer having no leakage or one in which the leakage is tuned out on the primary side (as has been the practice heretofore), there is a very considerable change in the phase of the antenna current with respect to the applied voltage when the changing weather condition has altered the capacity of the antenna. For instance, an antenna having 5 ohms resistance and 1000 ohms reactance under this condition would change the phase 45 degrees for ½ of 1% change in the antenna capacity.

Fig. 3 illustrates a coupling by means of which this may be avoided. The conductors 19 correspond to the line 19 in Fig. 1 and the two tuned circuits 81 and 83, one at each end of the figure, represent the pair of antennae 15 which are equivalent to one loop antenna. Considering one of these radiation circuits, it comprises a condenser 85 which in the physical structure, would usually be the capacity of the antenna to ground. It also includes a resistor 87 which will usually be the distributed resistance of the radiation circuit. It also includes an inductance 89 and an inductance 91. One end preferably both of these are lumped inductances provided by introducing a coil into the antenna.

The line 19 is connected to the primary 93 of a transformer 95, the secondary 97 of which is connected to the two terminals of the inductor 91. Similar connections from the line 19 to the radiation circuit at the opposite end of the diagram are indicated by similar reference numerals.

In the operation of that form of coupling illustrated in Fig. 3, the voltage across the inductor 91 is nearly but not quite in opposition to the voltage through the circuit including resistor 87, condenser 85 and inductor 89. The current delivered by the secondary of the transformer 95 need supply only the resistance losses in the resistor 87, which may be considered as including the radiation resistance of the circuit. The voltage across the resistor 87 is small and is equal to the vectorial sum of the voltage across the inductor 91 and the voltage across the inductor 89 and condenser 85. These two voltages must therefore be nearly in opposition because their resultant is small when they are each large.

A change in the impedance of the condenser, such as might occur with changing weather conditions, say for example a change of 1 or 2% will have a small effect upon the magnitude and a still smaller effect upon the phase of the voltage supplied by the transformer 95, or, stated the other way about, if the phase of the voltage delivered by the transformer be constant, the phase of the voltage across the condenser 85 and inductor 89 will change but slightly with the changes in capacity which occur because of changed weather conditions.

This may be clearer from the statement of a particular case. When the resistance of the radiation circuit was 5 ohms, the impedance of the condenser was 1000 ohms, the impedance of inductor 89 was 900 ohms and the impedance of the inductor 91 was 100 ohms, each of said impedances being measured at the resonant frequency of the radiation circuit, it was found that a change of ½ of one per cent in the antenna capacity resulted in a change of phase too small to be measured, the phase relation between the voltage impressed upon the transformer and the current in the radiating circuit being substantially 90° at all times.

The inductor 91 need not be present as a physically distinct inductance but the leakage of the transformer 95 may serve to simulate this inductance. In other words, if the inductor 89 be chosen of somewhat smaller impedance, than is necessary for resonance, and the transformer be designed with sufficient leakage to supply the inductance in the radiation circuit equivalent to this missing impedance, the results described above can be obtained.

When such a circuit is fed from a transmission line 0, 180 or 360, etc. degrees long, the antenna current phase becomes stabilized with respect to the line sending end voltage. Thus a pair of antennae fed from a common voltage source may have their antenna currents in phase synchronization regardless of small variations of antenna capacities.

In Fig. 4, a mechanically driven electrostatic coupling is illustrated which may be used instead of rotating coils. Any source of high frequency power, such as the generator 99, supplies a tank circuit 101 through connections including a condenser 103. The condenser comprises a rotating part 105 and stationary parts 107 and 109 respectively. The rotating part 105 is driven by any suitable motor 111 and when it is in close proximity to one stationary part, the coupling between the generator 99 and the load circuit is close. When the rotating member 105 is in the illustrated position, remote from either stationary part, the coupling is loose. The generator will, therefore, deliver more power at one position of the member 105 of condenser 103 than at the other. Rotation of the moving part of the condenser will thus cause modulation of the current in the tank circuit 101, accompanied by suppression of the carrier.

The circuit of Fig. 5 illustrates another coupling scheme in which a variable resistor is employed for obtaining the effects of modulation and suppression of the carrier. In this circuit, a preferably circular resistor 113 provided with a rotatable contactor 115 is shunted across a tank circuit, comprising an inductor 117 across whose terminals is connected a capacitor 119. A source of carrier frequency 121 is impressed upon the circuit between the rotatable contactor 115 and the midpoint of the inductor 117 and output leads are tapped off from the inductor, one on each side of the mid-point thereof in balanced relationship. It should now become apparent that as the resistor contactor 115 is rotated, the carrier frequency potential will shift from one end of the inductor 117 to the other about the mid-point thereof and at a frequency of modulation proportional to the rotational speed of the contactor. The result will be a suppressed carrier in the output leads modulated at a frequency of rotation of the contactor 115.

While I have disclosed my invention as it is embodied in an airplane beacon system, it could readily be applied to multiplex telegraphy, standard signal generator and many other applications of the invention disclosed herein will occur to those skilled in the art. The specific description and reference to only a few applications is not to be construed as a limitation.

I claim as my invention:

1. In a signalling system, two directive radiators, a source of radiation frequency, means connecting said source to each of said radiators, said means including reversible coupling devices of different time periods, at least one for each radiator for periodically altering the influence of said source upon said radiators at different rates whereby the outputs of said two radiators will be modulated with different modulation frequencies.

2. In combination, a stationary coil, a movable coil, one of said coils being coupled to a radiating circuit, means for periodically reversing the movable coil so as to continuously change the coupling between it and the stationary coil, a source of high-frequency energy supplying one of said coils and an output circuit supplied by the other coil, and a non-radiating circuit coupled to said coils to maintain a substantially constant load on said source of high frequency energy.

3. In combination, a pair of circuits, means for supplying energy at radio frequency to said circuits and means for mechanically reversing the phase of the radio frequency energy supplied to said circuits at rates which differ in the respective circuits.

4. In combination, a pair of circuits, a source of high frequency energy coupled to said pair of circuits, and means for mechanically reversing the phase of the high frequency energy supplied to one circuit at a different rate from that to the other circuit.

5. In combination, a pair of circuits, means for supplying high frequency energy to each of said circuits, means for mechanically reversing the phase of the high frequency energy in one of said circuits at one rate, and separate mechanical means for reversing the phase of the energy in said other circuit at a different rate.

FORREST S. MABRY.